Dec. 17, 1957 R. D. HOFFMAN 2,816,552
TEAT BISTOURY WITH IMPROVED CUTTER BLADE ADJUSTING MEANS
Filed June 29, 1954 2 Sheets-Sheet 2
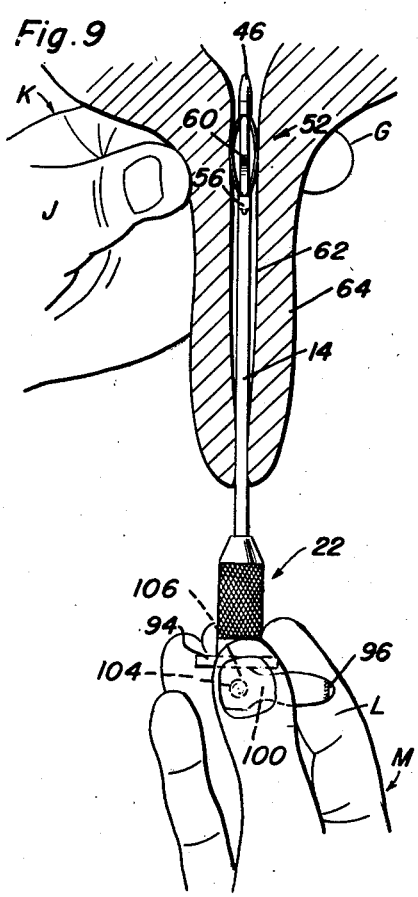
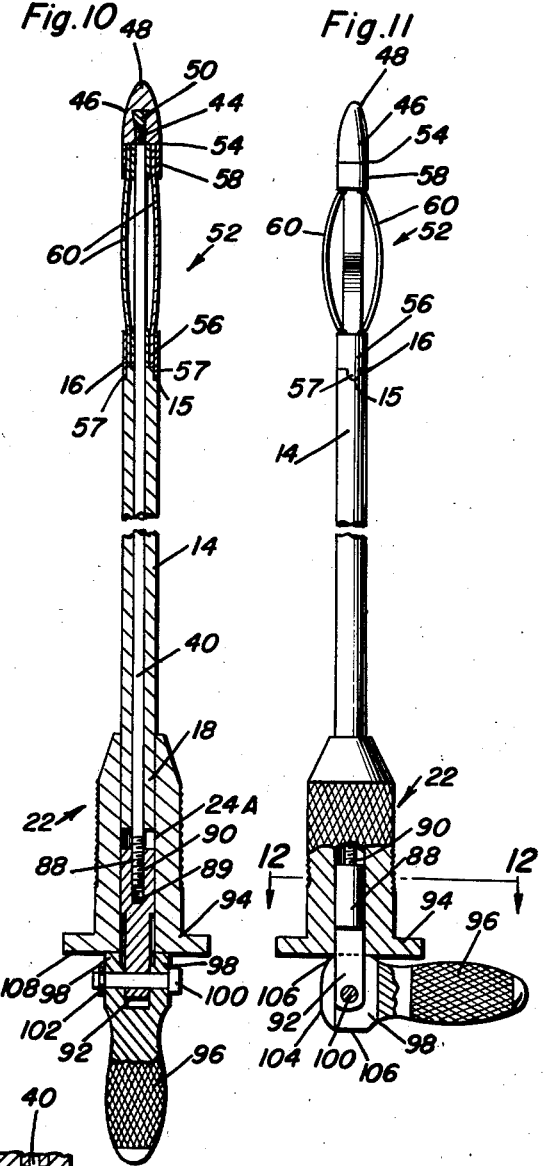
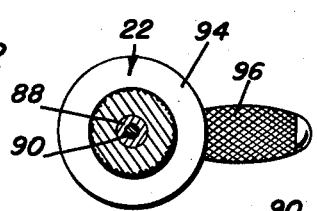
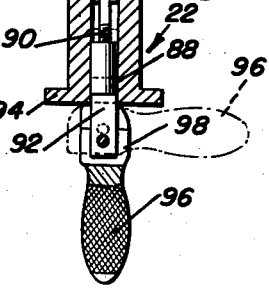
Roy D. Hoffman
INVENTOR.
BY United States Patent Office 2,816,552
Patented Dec. 17, 1957

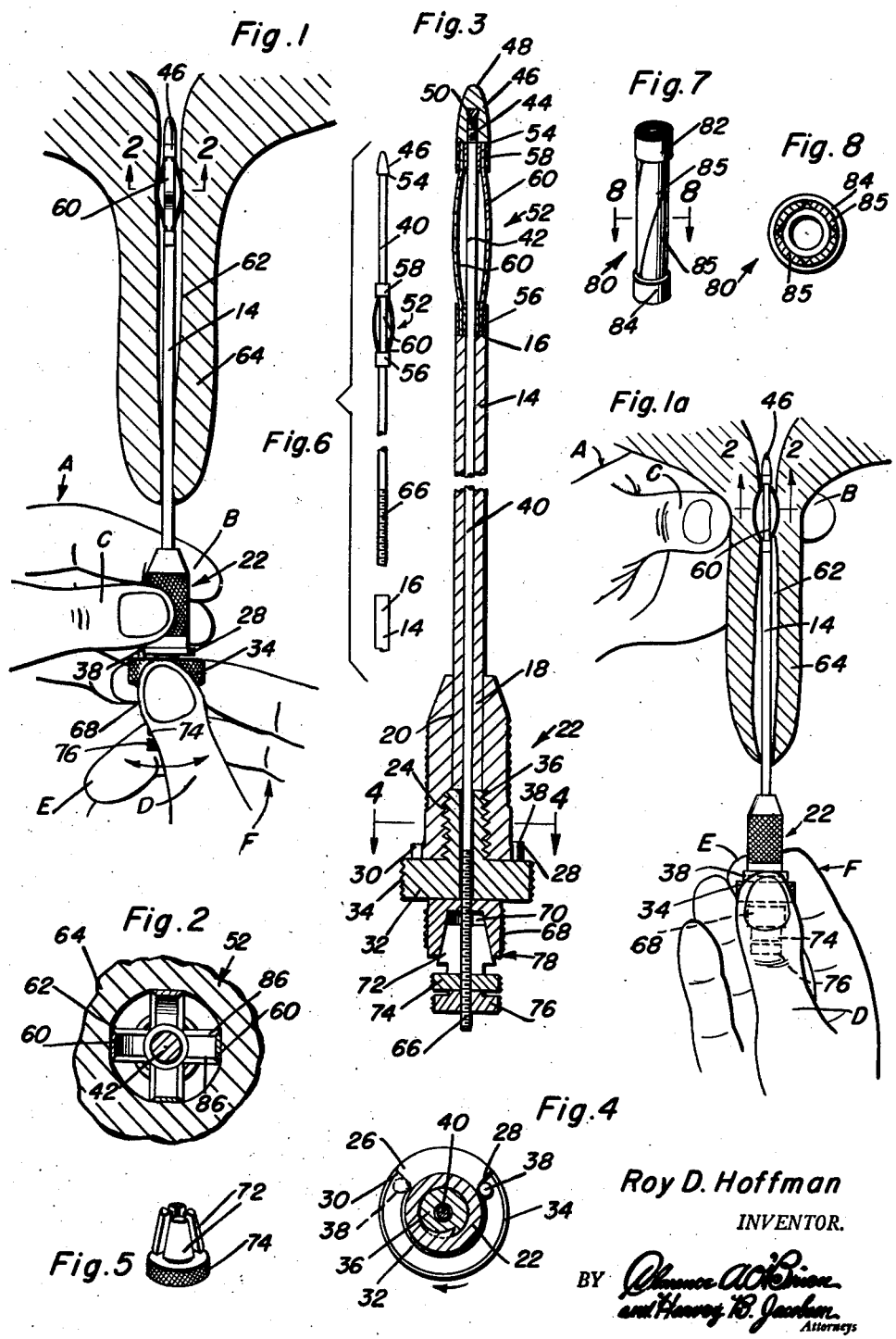
Dec. 17, 1957 — R. D. HOFFMAN — 2,816,552
TEAT BISTOURY WITH IMPROVED CUTTER BLADE ADJUSTING MEANS
Filed June 29, 1954 — 2 Sheets-Sheet 1
Roy D. Hoffman
INVENTOR.

2,816,552

TEAT BISTOURY WITH IMPROVED CUTTER BLADE ADJUSTING MEANS

Roy D. Hoffman, Bedford, Pa.

Application June 29, 1954, Serial No. 440,099

4 Claims. (Cl. 128—305)

The present invention relates to certain new and useful improvements in teat instruments, broadly classified, and has reference in particular to a novel teat bistoury, one which is recognized as unique in that it is characterized, in part, by readily expansible and contractible cutter means so designed and operating that it may be advantageously and reliably used in the debridement of plugged or clogged milk ducts or teat canals, as they are commonly referred to, this in a practicable, expedient and efficacious manner.

In carrying out the inventive ideas herein under advisement, an instrument is provided in which regulable adjustment is had and precision usefulness is assured, this in a manner to promote keen cleavage and safe operational requirements, whereby to provide a highly efficient bistoury in which manufacturers, veterinarians and others will find their respective requirements and needs effectually thought out and satisfactorily met.

Another object of the invention has to do with a bistoury which is characterized by a barrel and cooperating rod member and wherein a novel cutter unit is mounted on and carried by the rod member and is readily applicable and removable and is characterized by expansible and contractible blades or knives which, when expanded, permit cuttings to enter between the blades and to be trapped within the confining limits of the cooperating blades and, when the blades are contracted and closed, permits the then trapped cuttings to be drawn out of the teat canal for analysis, diagnosis and subsequent disposal.

Another object of the invention is to provide an instrument wherein all blades are longitudinally beveled on the inside surfaces and are smooth surfaced on the outside, which construction aids in confining the cuttings within the cutter and wherein the blades, being sharp along both longitudinal edges, make it possible to remove large growths, this being accomplished easily by cutting the growths with an oscillating or back and forth movement or a straight around rotating movement either clockwise or counter-clockwise, as the case may be.

Another object of the invention has to do with a construction in which the elements and parts are such that the entire instrument may be readily assembled and disassembled.

Features and advantages in addition to those specifically mentioned above will become clearly apparent upon study of the following detailed description and the various views in the accompanying sheets of illustrative drawings.

In the drawings, wherein like numerals are employed to designate like parts throughout the views:

Figure 1 is an elevational view of a teat bistoury constructed in accordance with the principles of the present invention and showing the manner in which the same is inserted and expanded;

Figure 1a is a view similar to Figure 1, showing the final step of usage and wherein the position of the hands is properly illustrated.

Figure 2 is a cross-section on an enlarged scale, the section being on the line 2—2 of Figure 1, looking in the direction of the arrows;

Figure 3 is a view in section and elevation of the complete bistoury illustrating the details and their relative association and arrangement;

Figure 4 is a section on the horizontal line 4—4 of Figure 3, looking in the direction of the arrows;

Figure 5 is a perspective view of one of the details;

Figure 6 is an exploded elevational view on a smaller scale showing the rod removed from the barrel and with the cutter unit in the process of being slid for removal from the rod;

Figure 7 is a perspective view of a modified cutting unit;

Figure 8 is a section on the line 8—8 of Figure 7, looking in the direction of the arrows;

Figure 9 is an elevational and sectional view similar to Figure 1 and showing a second embodiment of the invention and the manner in which it is constructed and used;

Figure 10 is a sectional and elevational view illustrating the details and their construction and arrangement and showing the blades of the cutter unit contracted or closed;

Figure 11 is a view in section and elevation based on Figure 10 and showing the toggle-type controller lever in the position it assumes when the blades of the cutter unit are expanded or opened;

Figure 12 is a section on the line 12—12 of Figure 11, looking in the direction of the arrows; and Figure 13 is a cross-sectional detail view of an alternate toggle lever control to expand and contract the blades of the cutter unit.

Referring now to the drawings with the aid of reference numerals and accompanying lead lines, and especially to the embodiment of the invention covered in Figures 1 to 5, inclusive, the rigid linearly straight barrel is denoted by the numeral 14 and the flat distal end constitutes the aforementioned thrust receiving shoulder 16. The lower or proximal end portion 18 of the barrel telescopes into an axial bore 20 in a substantially cylindrical finger-grip 22. It is fixed in the bore in any suitable manner. It will be noticed that it terminates intermediate the ends of the bore to define a socket 24 which latter is screw threaded. At the bottom (in the drawings) there is a sector-shaped lateral flange 26, the ends of which provide stop shoulders 28 and 30, respectively. The numeral 32 designates a relatively movable finger-grip which is sometimes referred to as a rotating wheel and this abuts the flanged end of the finger-grip 22 and its peripheral surface is milled or knurled, as at 34. This finger-grip is centrally bored and has a screw threaded stem portion 36 which is screwed of threaded into the screw threaded socket 24. It is provided on its top side with a stop lug or pin 38 which is selectively engageable with the stop shoulders 28 and 30, in the manner shown in Figure 4.

The rod or shaft is also linearly straight, and this is denoted by the numeral 40, and it is of a length greater than the length of the barrel. It is removable and insertable and is rotatable and slidable in the bore of the barrel. The end portion 42 extends beyond the thrust shoulder 16 and the extreme end is screw threaded at 44 and screwed into a socket in a bullet-shaped head 46, sometimes called a piloting head and having a blunt piloting nose 48. The numeral 50 designates solder or the like which secures the head to the rod. The cutter unit is denoted generally at 52 and is interposed between the thrust shoulder 16 and the complemental second thrust shoulder 54 provided by the head. It comprises an inter or first ferrule or collar 56 which encircles the rod-end 42 and abuts the shoulder 16. The second ferrule or collar 58 abuts the shoulder 54. The flat spring steel cutter blades are denoted by the numerals 60 and they have their respective ends secured to the respective ferrules 56 and 58, in the manner shown. The inherent resiliency of the spring metal is such that the blades normally contract to the positions shown in Figure 3. However, the blades may be expanded or bowed to the position shown for operation in Figure 2, where the instrument is inserted in the canal 62 in the teat 64. The number of blades is not critical to the operation of the device, four being shown for purposes of illustration of the operation of the device.

The means at the trailing end for sliding and also turning the rod 40 is mounted on the screw threaded end 66. The means comprises a hollow nut or knob 68 having a recess 70 to receive the tapered split segments 72 on the clamping nut 74. The numeral 76 designates a lock nut cooperating with the nut 74. The several parts 68, 74 and 76 go to make up not only a rotating knob for the rod but also a shoulder and the several parts, as a unit, are denoted by the numeral 78.

It will be evident that the teat bistoury is easily inserted into the teat by grasping the teat with the thumb and index finger and gently inserting through the usual sphincter canal. After the instrument is inserted, all that is necessary is to expand the blades by turning a stop pin from retarded or closed position to any desired degree of blade expansion. Manifestly, the diseased tissue may be cut and removed by turning the instrument either clockwise or counter-clockwise while pressure is exerted on the teat from the outside. The degree of pressure will regulate the amount of tissue that will be removed with each turn. It is necessary, obviously, to turn the instrument until the desired amount of tissue is removed. This can be determined by lowering the instrument in the teat canal and palpating area.

It will be noted that when the stop pin 38 engages the shoulder 28, as shown in Figure 3, the blades of the cutter 52 are contracted or closed. When swung in the direction of the arrow in Figure 4 by turning the finger-grip 32 from right to left, the stop pin engages the shoulder 30, at which time, the blades are bowed or open, as shown in Figure 1. When the finger-grip 32 is turned from right to left (Figures 3 and 4) after the device is placed, and the stem portion 36 backs out of the socket 24 and exerts pressure against the knob means 78 which latter then serves as a shoulder and obviously slides the rod 40 down through the barrel 14, which results in squeezing the two shoulders 54 and 16 together and expanding the blades, in an obvious manner. It will be evident from Fig. 1 that this illustrates the method of expanding the blades. Here, the left hand A has the fingers C and B holding the finger-grip 22. This is the position and function of the left hand. The right hand F is also used in the manner shown with the thumb and index finger grasping the movable finger-grip 32. Obviously, by turning from right to left or clockwise, the blades are expanded, and by turning from left to right, or counter-clockwise, the blades are contracted. With reference now to Figure 1a, this shows the manner in which the fingers C and B of the left hand A catch hold of and maneuver the teat. It also shows how the fingers D and E of the right hand F come into play in catching hold of and turning the entire instrument with the cutter as an entity. There are various other techniques involved in the repair of teat orifices, the removal of polyps and repair of mashed teats, and so on, but it will be evident that these not be dwelt upon here.

In Figure 6, the rod has been removed from the barrel by removing the lock nut 76, nut 74 and accompanying hollow nut 68. This allows the rod to be pulled through the barrel, after which the cutter unit 52 may be slid off the rod for repair or replacement, as the case may be.

In some instances, instead of using the type of cutter illustrated in Figures 1 and 3, the alternate type shown in Figures 7 and 8 may be employed. This modified cutter is denoted by the numeral 80 and comprises ferrules 82 and 84 connecting the blades 85 which are here helically twisted. In both forms of the invention, the blades preferably have their longitudinal edges beveled on the inner surfaces of the blades, as at 86—86; however, the bevel may be formed on the outer surfaces or omitted when considered necessary or desirable in the use of the instrument.

In the modification shown in Figures 9 to 12, inclusive, the cutter means or unit, barrel, rod and essential parts are all the same as already shown and described in the other figures. Therefore, the same numerals are employed. The difference in construction here has to do with the operating means for sliding and rotating the rod and opening and closing the blades of the cutter unit. It will be noticed, however, that the wall of the axial socket, here denoted at 24-A, is smooth instead of being screw threaded. In this construction, there is a smooth surfaced socket member 88 slidable in the socket 24-A and it has an axial screw threaded socket 89 therein into which the screw threaded end 90 of the rod 40 is adjustably screwed. There is a shank 92 extending beyond the flange 94 to accommodate the toggle-type suitably knurled lever 96. The lever is bifurcated, and the furcations are denoted by the numerals 98—98, and these straddle the shank 92 and are bolted thereto by an insertable and removable bolt 100 and suitably retained washer 102. The furcations have straight edges at right angles to the axis of the lever, which edges are denoted by the numeral 104 in Figure 11. They also have curvate or cam edges 106 which come into movable cam contact with the coacting surface 108 of the flange 94.

In this arrangement, when the lever is in axial alignment with the barrel and rod, as shown in Figure 10, the inherent resiliency of the cutter blades serves to contract the blades to thus close the knife or cutter unit. When the lever is swung at right angles, as shown in Figures 9 and 11, the blades are swung open or bowed to the position shown in Figure 9. It will be obvious that the instrument is inserted in the duct 62 of the teat 64 in the same manner already described, that is, with the blades of the cutter unit contracted. When the blades are contracted, they are of an outside diameter which is equal to or less than the outside diameter of the barrel 14. This makes it easy to insert the instrument. It will be noticed in connection with this form of the invention that the lower ferrule 56 is provided with diametrically opposite keying lugs 57 which are fitted into receiving notches or keeper seats 15 in the barrel 14. Consequently the cutter means 52, by way of these complements 15 and 57, is keyed to the barrel. It follows that the barrel 14, rod 40 and cutter means on the outer end of the rod turn as an entity or unit. This is accomplished in the manner shown in Fig. 9. Here, one sees the fingers J and G of the hand 11 grasping the teat 64 with the fingers of the right hand M, thumb and index finger L catching hold of and turning the lever 96 and also the finger-grip 22 as a unit. It is believed that it is sufficient to limit the explanation accordingly, since a more elaborate and similar interpretation has already been given in respect to the form of the invention identified as that appearing in Figs. 1 to 8, inclusive.

The toggle lever 96 may also be provided with the cam surfaces formed to expand the cutters when moved to a position in alignment with the barrel, contracting the cutters on movement to the right, as shown in skeleton outline in Figure 13. The formation of the cam surface on the toggle lever of this figure prevents swinging of the toggle lever to the left from its aligned position with the barrel as a safety precaution against inadvertent contraction. However, the toggle lever could be made to contract or release the blades when swung either to the right and/or left.

It is believed that the description taken in conjunction with the drawings will enable the reader to obtain a clear understanding of the construction and operation of the embodiment of the bistoury herein revealed. It is felt, therefore, that a more extended description is unnecessary.

Changes in shape, size and rearrangement of the elements and parts may be resorted to, in actual practice, within the scope of the subjoined claims.

What is claimed as new is as follows:

1. A teat bistoury comprising a rigid barrel having a distal end and a proximal end, said distal end constituting a thrust reception shoulder, said proximal end embodying a stationary fingergrip, a rod having a leading end terminating in a piloting head and one end of said head constituting a second thrust shoulder spaced from and axially aligned with said first named thrust shoulder, said rod being fitted slidably, rotatably and removably in the bore of said barrel, a bladed expansible and contractible cutter unit mounted on said rod between the respective thrust shoulders, the trailing end of said rod projecting to a position beyond said finger-grip, means on said trailing end for rotating the rod in the bore of the barrel, a relatively rotatable finger-grip interposed between said means and said stationary finger-grip and adjustably connected with the latter, said stationary finger-grip being provided with circumferentially spaced stop shoulders, and said relatively rotatable finger-grip being provided with a stop pin selectively engageable with said stop shoulders.

2. A teat bistoury comprising a rigid barrel having a stationary finger-grip fixed to one end of the barrel, a rod rotatable in the bore of said barrel and having a head on the leading end providing a shoulder, a cutter having longitudinally spaced ferrules on said rod and located between said head and the leading end of said barrel, expansible and contractible blades connected at their respective ends to their respective ferrules, a second but movable finger-grip having a hollow screw threaded stem screwed into a screw threaded socket provided therefor in said stationary finger-grip, the adjacent end of said rod extending through said stem and beyond said movable finger-grip, and shoulder means on the last named end portion of the rod, said movable finger-grip being interposed between the stationary finger-grip and said shoulder means and having end thrust and rod adjusting engagement with said shoulder means, said stationary finger-grip being provided with a lateral segmental flange, the ends of which constitute stop shoulders, said movable finger-grip having a single upstanding lateral stop pin selectively engageable with said shoulders.

3. A teat bistoury comprising a rigid barrel having a stationary finger-grip fixed to one end of the barrel, a rod rotatable in the bore of said barrel and having a head on the leading end providing a shoulder, a cutter having longitudinally spaced ferrules operatively mounted on said rod and located between said head and the leading end of said barrel, expansible and contractible blades connected at their respective ends to their respective ferrules, a second but movable finger-grip having a hollow screw threaded stem screwed into a screw threaded socket provided therefor in said stationary finger-grip, the adjacent end of said rod extending through said stem and beyond said movable finger-grip, and shoulder means on the last named end portion of the rod, said movable finger-grip being interposed between the stationary finger-grip and said shoulder means and having end thrust and rod adjusting engagement with said shoulder means, said adjacent end of the rod being screw threaded, and said shoulder means comprising a plurality of cooperating nuts threaded on said screw threaded end and removable therefrom to permit the rod to be extracted from the bore in said barrel.

4. A teat bistoury comprising a rigid barrel having a stationary finger-grip fixed to one end of the barrel, a rod rotatable in the bore of said barrel and having a head on the leading end providing a shoulder, a cutter having longitudinally spaced ferrules operatively mounted on said rod and located between said head and the leading end of said barrel, expansible and contractible blades connected at their respective ends to their respective ferrules, a second but movable finger-grip having a hollow screw threaded stem screwed into a screw threaded socket provided therefor in said stationary finger-grip, the adjacent end of said rod extending through said stem and beyond said movable finger-grip, said adjacent end of the rod being screw threaded, a first finger-gripping nut threaded thereon and abutting said movable finger-grip, a second nut also threaded thereon and cooperating with the first nut, and a third lock nut cooperable with the second nut.

References Cited in the file of this patent

UNITED STATES PATENTS

| 365,969 | Collins | July 5, 1887 |
| 618,521 | Palmer | Jan. 31, 1899 |
| 687,112 | Bowker | Nov. 19, 1901 |
| 2,556,783 | Wallace | May 16, 1951 |
| 2,730,101 | Hoffman | Jan. 10, 1956 |